United States Patent [19]
Haferl

[11] Patent Number: 4,719,392
[45] Date of Patent: Jan. 12, 1988

[54] RASTER CORRECTION CIRCUIT

[75] Inventor: Peter E. Haferl, Adliswil, Switzerland

[73] Assignee: RCA Corporation, Princeton, N.J.

[21] Appl. No.: 875,708

[22] Filed: Jun. 18, 1986

[30] Foreign Application Priority Data

Feb. 27, 1986 [GB] United Kingdom ............... 8604865

[51] Int. Cl.$^4$ ............................................. H01J 29/56
[52] U.S. Cl. ..................................... 315/371; 315/370
[58] Field of Search ........................ 315/370, 371, 411

[56] References Cited

U.S. PATENT DOCUMENTS

4,565,949  1/1986  Haferl ................................. 315/371
4,625,154 11/1986  Willis ................................. 315/371

*Primary Examiner*—Theodore M. Blum
*Assistant Examiner*—Gregory C. Issing
*Attorney, Agent, or Firm*—Eugene M. Whitacre; Joseph J. Laks; Sammy S. Henig

[57] ABSTRACT

In a deflection apparatus which corrects for inside pincushion distortion, a deflection winding and a retrace capacitance form a retrace resonance circuit during a retrace interval. A trace capacitance forms a trace resonant circuit with the deflection winding during the trace interval. A circuit branch, that includes a second capacitance and an inductance, is coupled to the trace capacitance during the trace interval to form a second resonant circuit with the trace capacitance having a resonance frequency that is substantially higher during the trace interval than that of the trace resonant circuit. A current in the circuit branch, that is modulated in accordance with the modulated voltage, modulates the trace parabolic voltage across the trace capacitance in a manner to reduce inside pincushion distortion. The trace capacitance acts as a bypass capacitor around the inductance during retrace to prevent the inductance from affecting the retrace voltage.

27 Claims, 16 Drawing Figures

UNCORRECTED RECEIVER (E-W CIRCUIT INOPERATIVE)

RASTER CORRECTION CIRCUIT

This invention relates to a deflection circuit in which the "S"-shaping of the deflection current may be varied or modulated over a relatively wide range for obtaining inside pincushion distortion correction.

Color television picture tubes with a faceplate radius R greater than 1, such as, for example, Philips 45AX picture tube in which R is equal to 1.6, may require a significantly high amount of inside pincushion correction, which makes an adjustment for inside pin desirable.

Some prior art raster correction circuits provide inside pin correction by utilizing a modulation inductor serially coupled with the deflection winding. The modulation inductor increases the total deflection inductive impedance. In particular, at line frequencies higher than $1 \times f_H$, where $f_H$ is the horizontal frequency in, for example, PAL standard, more deflection power is dissipated and a higher retrace voltage pulse appears across the deflection switch because of the increased inductive impedance. It is, therefore, desirable to provide inside East-West raster correction without utilizing such a modulation inductor.

Figure 4:
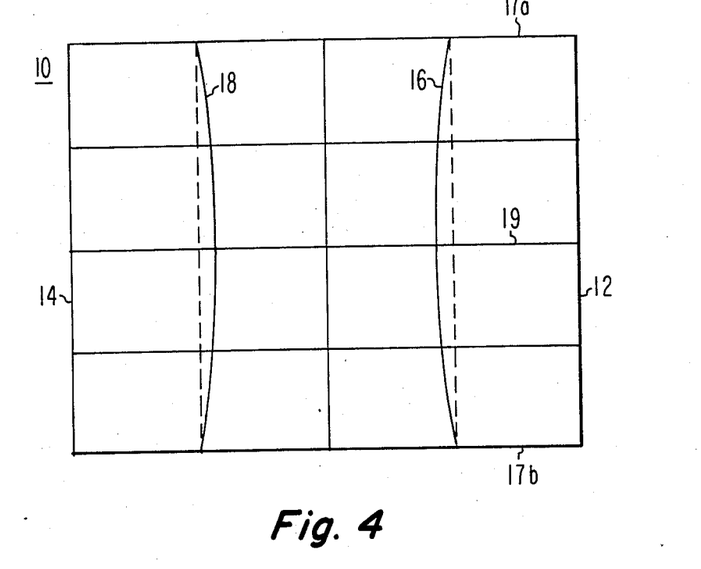
FIG. 4 illustrates a crosshatch pattern in which the inside pincushion distortion is uncorrected.

FIG. 4 illustrates inside pincushion distortion as it appears on a television raster displaying a crosshatch line pattern indicated generally by 10. The right and left sides of the crosshatch pattern are defined by vertical lines 12 and 14. Lines 12 and 14 are straight, indicating that the raster is East-West outside pincushion corrected. Vertical grid lines 16 and 18 lying between the center and the sides of the raster are curved, as indicated by their departure from the straight dotted lines, indicating the presence of inside pincushion distortions. Horizontal lines 17a and 17b illustrate the horizontal scanning position for a top or a bottom raster scanning example; whereas horizontal line 19 illustrates the horizontal scanning position for a center raster scanning example.

The correction of the inside pincushion distortion requires a modulation of the "S"-shaping of the deflection current during horizontal trace along the vertical scanning axis. It may be desirable to increase the "S"-shaping from top to the center of the raster and to decrease the "S"-shaping from the center to the bottom of the raster to obtain straight vertical lines such as shown by the dotted lines in FIG. 4.

In accordance with an aspect of the invention, a deflection apparatus with inside pincushion distortion correction includes a deflection winding for generating scanning current at a deflection rate in the deflection winding during a trace interval and during a retrace interval of a deflection cycle. Switching means coupled to the deflection winding generates during the retrace interval a retrace voltage. The switching means also generates the scanning current. A modulated voltage is generated during the retrace interval. The modulated voltage is modulated in accordance with a modulation signal at a second frequency. A trace capacitance coupled to the deflection winding forms with the deflection winding a first trace resonant circuit during the trace interval such that the scanning current that flows in the trace capacitance develops during the trace interval a parabolic voltage in the trace capacitance. A circuit branch, including a second capacitance and a modulation inductance, that is coupled to the trace capacitance forms with the trace capacitance a second resonant circuit for generating in the modulation inductance a modulation current at an amplitude that is modulated by the modulated voltage during the retrace interval. The modulation current is coupled to the trace capacitance to vary the parabolic voltage in the trace capacitance in accordance with the amplitude of the modulation current in a manner to reduce inside pincushion distortion. The trace capacitance acts as a low impedance bypass capacitance for the scanning current around the modulation inductance substantially throughout the retrace interval.

Figure 2:
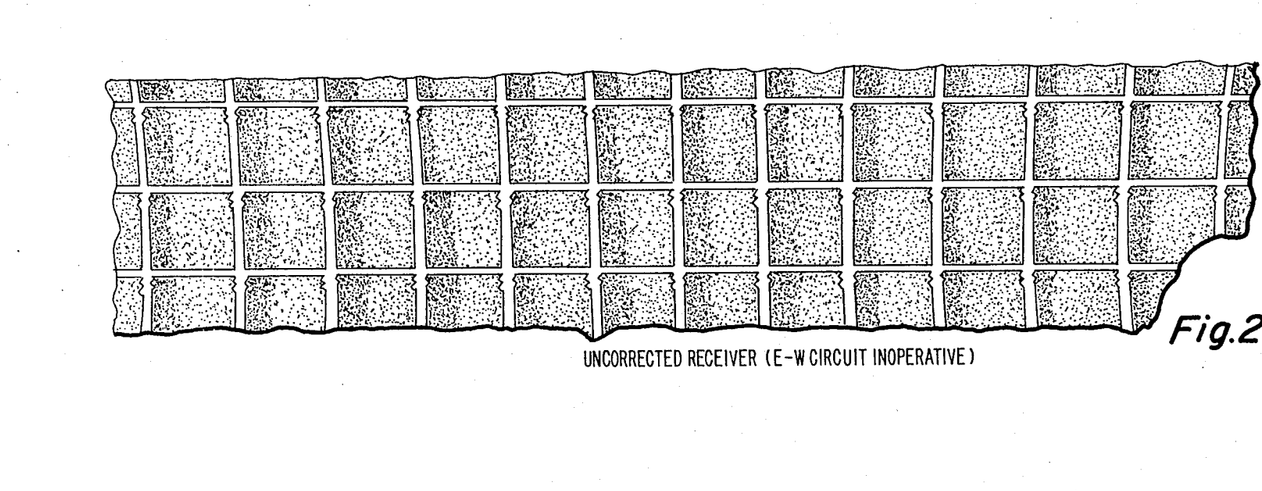
FIG. 2 illustrates a crosshatch pattern in which "mouseteeth" distortion is uncorrected.

The horizontal deflection circuit, in some conventional television receivers, encompasses an output stage that includes a horizontal deflection winding and a trace capacitance that supplies deflection current to the deflection winding during each trace interval. A retrace capacitance is coupled across the deflection winding during the retrace interval. Energy is replenished during retrace via a flyback transformer. The heavy loading of the high beam current in a secondary winding of the flyback transformer, that occurs in the course of displaying, for example, each white horizontal strip of a crosshatch pattern such as shown in FIG. 2 represents a heavy load to the flyback transformer during retrace. The retrace capacitance is slightly discharged during retrace due to this loading. This results in a discharge current from the trace capacitance into the retrace capacitance through the deflection winding and a slight drop of the voltage across the trace capacitance during the white horizontal strips of the crosshatch pattern. The charge of the trace capacitance is replenished during the retrace intervals associated with the scan lines that display the black picture portion underneath the white crosshatch stripes. This causes a small current in the opposite direction through the deflection winding. The charge and discharge current of the trace capacitance produces a small raster displacement and results in low frequency oscillations modulating the deflection winding trace current. This low frequency modulation may cause each vertical strip of the crosshatch pattern to appear as being of a zig-zag shape, instead of a straight line shape. The zig-zag shape appears in a given vertical strip immediately below the intersection point with a horizontal strip. Such distortions that are sometimes referred to by the name "mouseteeth" distortions are illustrated in the crosshatch pattern of FIG. 2. They appear, during and just after the times in which high beam transients occur, because the deflection circuit that represents a low impedance energy flywheel, supplies the transient increased in energy requirement of the ultor circuits. Thus, energy transferred from the deflection circuit to the ultor circuits may tend to cause variations in the deflection winding trace current. It may be desirable to reduce "mouseteeth" distortion.

In accordance with another aspect of the invention, the deflection current amplitude is modulated for obtaining inside and outside pincushion distortion correction without substantially affecting the high voltage amplitude or the deflection retrace time and in such a way that "mouseteeth" distortion is reduced.

Figure 1:
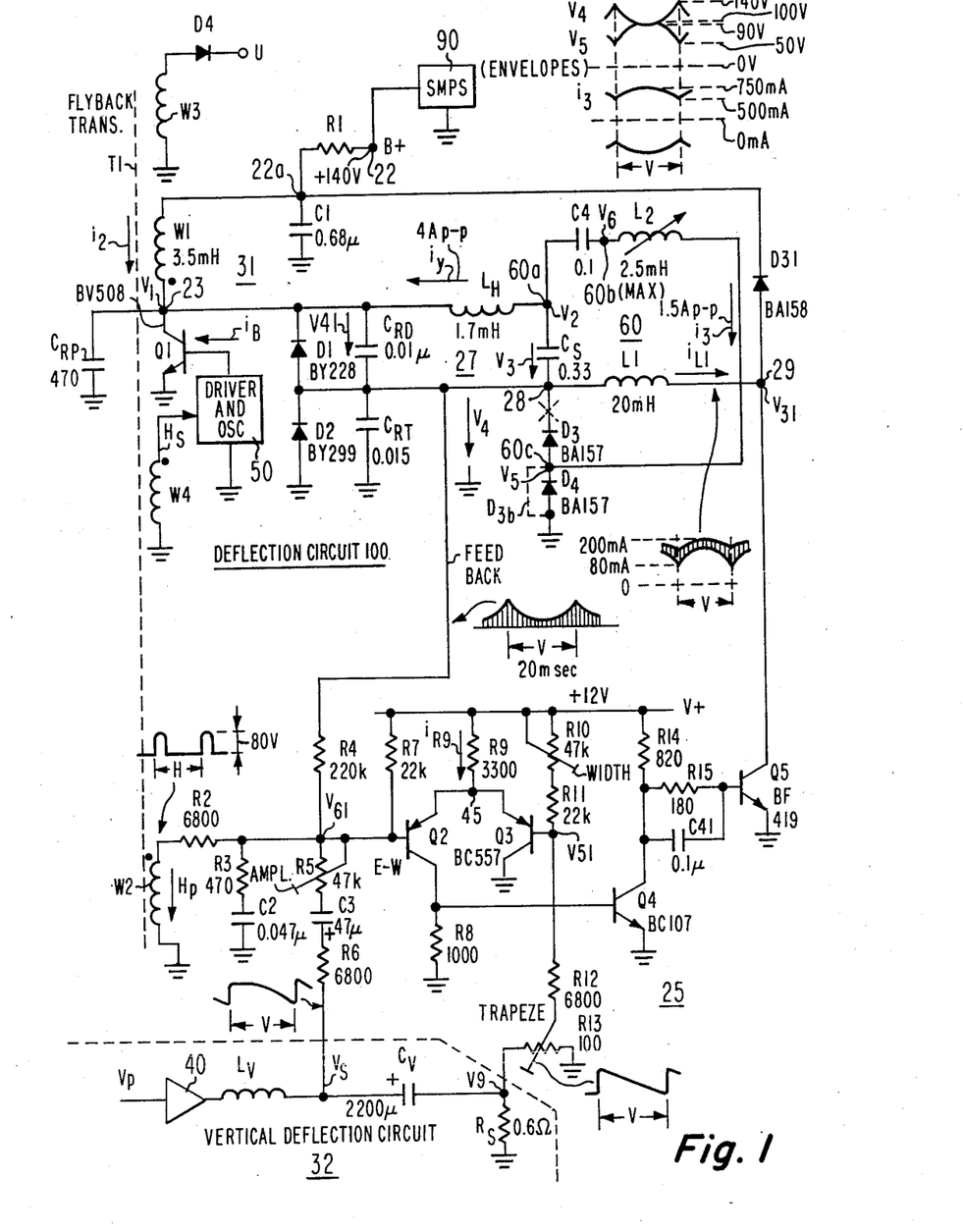
FIG. 1 illustrates a deflection circuit with inside and outside pincushion distortion correction embodying an aspect of the invention.

Deflection circuit 100 of FIG. 1, embodying an aspect of the invention, may provide horizontal deflection of the electron beams in, for example, a Philips 110° 45AX FS color picture tube type A66-EAK00X01. In FIG. 1, a source of regulated direct current voltage B+, developed between a terminal 22 and ground, is coupled through a small-valued resistor R1 to a terminal 22a of a primary winding W1 of a horizontal flyback transformer T1. The other terminal of winding W1 is coupled to a junction terminal 23. A filtering capacitance C1 is coupled from terminal 22a to ground. Regulated voltage B+ is generated, for example, by a switched mode power supply 90. A secondary winding W3 of transformer T1, supplies an ultor voltage U through a diode D4.

A horizontal output transistor Q1, having its base coupled to a conventionally built driver and oscillator circuit 50, has its collector to emitter path coupled between junction terminal 23 and ground. Paralleling transistor Q1 is the series arrangement of two rectifiers, diodes D1 and D2. Coupled between the anode and cathode electrodes of diode D1 is an arrangement of a horizontal deflection winding $L_H$ that is coupled to an S-shaping, or trace, capacitance $C_S$. A deflection retrace capacitance $C_{RD}$, coupled also between the anode and cathode electrodes of diode D1, forms with deflection winding $L_H$, a parallel retrace resonant circuit 27. A second retrace capacitance $C_{RT}$ is coupled between a junction terminal 28 and ground. A small-valued capacitance $C_{RP}$ is coupled between terminal 23 and ground. Capacitor $C_{RP}$ provides fine tuning of the resonance frequency of retrace resonance circuit 27. Coupled between a terminal 28 and ground, is a series arrangement of a choke L1, and a controllable East-West switched current arrangement 25 that includes a switching transistor Q5 and a diode D31. The inductance of choke L1 is substantially higher than that of deflection winding $L_H$.

In carrying out an aspect of the invention, an inside pincushion distortion correction circuit 60 includes a capacitance C4 that is coupled between a terminal 60b and a terminal 60a, the junction of capacitance $C_S$ and deflection winding $L_H$. A variable inductor L2 of circuit 60 is coupled between terminal 60b and a terminal 60c, the junction of diodes D3 and D4. The anode of a diode D4 is coupled to ground. The cathode of diode D4 is coupled to terminal 60c. A diode D3 is coupled between terminal 60c and terminal 28.

During the first half of trace, deflection current $i_y$ flows, in a direction opposing the arrow, in deflection winding $L_H$ and in diode D1. During the second half of trace, deflection current $i_y$ flows in deflection winding $L_H$, in the direction of the arrow, and in transistor Q1 that is conductive. At the end of trace, transistor Q1 becomes nonconductive and a retrace voltage $V_1$ is developed, in a conventional manner, between terminal 23 and ground.

During the retrace interval, charge is taken away from retrace capacitance $C_{RD}$ by modulated sink current $i_{L1}$ that flows via choke L1. The higher the integral, $\int i_{L1} dt$, during the entire retrace interval, for example, the larger becomes a voltage V41 across capacitance $C_{RD}$ and the smaller becomes a voltage $V_4$ across capacitance $C_{RT}$. The peak of deflection current $i_y$ through deflection winding $L_H$, during the trace interval, is directly related to the peak of voltage V41 across capacitance $C_{RD}$ at the center of the retrace interval. By modulating current $i_{L1}$ at a vertical rate, switched current arrangement 25 provides outside pincushion correction to horizontal scanning current $i_y$.

Controllable switched current arrangement 25 includes a differential pair of transistors Q2 and Q3, where both emitters of transistors Q2 and Q3 are coupled to a terminal 45 of a resistor R9. The other terminal of resistor R9 is coupled to a voltage source V+. Current $i_{R9}$, flowing in resistor R9, is split between transistors Q2 and Q3, respectively, in response to the difference voltage V61−V51 developed between the bases of transistors Q2 and Q3, respectively.

The collector current of transistor Q2 controls, via an inverting and driving transistor Q4, a switching transistor Q5 of arrangement 25 that operates in common emitter mode. The collector of transistor Q5 is coupled to a terminal 29 of choke L1 that is remote from resonant circuit 27. Thus, transistor Q5 is switched off and on, respectively, in accordance with the amplitude of the difference voltage V61−V51. Terminal 29 of choke L1 is also coupled through a diode D31 of switched current arrangement 25 to terminal 22a that is at approximately the potential of voltage B+. Diode D31 is poled to divert current $i_{L1}$ that flows through choke L1, and to clamp voltage V31 at terminal 29, when transistor Q5 is turned off, to the voltage that is present across capacitance C1. Conversely, when transistor Q5 is turned on, current $i_{L1}$ flows to ground through transistor Q5 causing voltage V31 to be at approximately ground potential.

Horizontal retrace pulses $H_p$, developed across a secondary winding W2 of flyback transformer T1, are coupled to the base of transistor Q2 through a resistor R2 and across a series arrangement of a resistor R3 and a capacitance C2. A vertical rate signal $V_s$, having a parabolic shape superimposed on a vertical sawtooth that is produced by a conventionally built vertical deflection circuit 32, is coupled to the base of transistor Q2 through a raster control arrangement of series resistors R6, R5 and capacitance C3. Thus, the base of transistor Q2 acts as a voltage summing junction. Vertical sawtooth voltage V9 across a sampling resistor $R_S$ of vertical deflection circuit 32 has a vertical rate sawtooth component. Voltage V9 is applied through a trapeze control resistor R13, that is in parallel with resistor $R_S$, to one terminal of a resistor R12. The other terminal of resistor R12 is coupled to the base of transistor Q3. Trapeze control resistor R13 is adjusted to cancel by common mode rejection the vertical sawtooth portion at the base of transistor Q2. Bias voltage V51, at the base of transistor Q3, is controlled by a series arrangement of a variable resistor R10 and a fixed resistor R11. The series arrangement of resistors R10 and R11 is interposed between voltage source V+ and the base of transistor Q3.

Voltage V4 between terminal 28 of choke L1 and ground is also coupled through a resistor R4 to the base of transistor Q2 to provide feedback that stabilizes the operation of switched current arrangement 25. Thus, capacitance C2, coupled to the base of transistor Q2, integrates the pulses of voltage $V_4$ to provide a vertical rate parabolic waveform feedback.

The difference voltage $V_{61}$-$V_{51}$ at the bases of transistors Q2 and Q3, respectively, modulates the time in which transistor Q5 is turned off during each horizontal trace interval in accordance with the vertical position of the scanning beam in the cathode ray tube screen.

FIGS. 3a-3i illustrate waveforms useful in explaining the operation of deflection circuit 100 of FIG. 1. Similar numbers and symbols in FIGS. 1 and 3a-3i indicate similar items.

Current $i_{L1}$ of FIG. 1 flows during each horizontal scanning trace interval through diode D2, choke L1 and transistor Q5 to ground until transistor Q5 is turned off at a controllable time. When scanning occurs at the top or bottom of the raster, transistor Q5 is turned off at time $t_9$ of FIG. 3i that illustrates the waveform of current $i_{L1}$ of FIG. 1. On the other hand, at the center of the raster, it is turned off at a later time $t_{10}$ of FIG. 3i. When transistor Q5 of FIG. 1 is turned off, current $i_{L1}$ is diverted from transistor Q5 to flow through diode D31. This produces a decay of current $i_{L1}$ during the remainder of the trace interval. During the retrace interval, current $i_{L1}$ increases, as illustrated, for example, during interval $t_1$-$t_7$ of FIG. 3i for the top or bottom scanning example. Because of the high impedance of choke L1 relative to that of deflection winding $L_H$ during retrace, no significant coupling is produced between retrace resonant circuit 27 and primary winding W1 for high frequency load related currents in the primary winding. During retrace, capacitor $C_{RT}$ that is not bypassed by circuit 60, provides loose, or low, coupling between transformer T1 and trace capacitor $C_s$. Such loose coupling prevents the discharge of capacitor $C_s$ by the current that flows in high voltage winding W3 of transformer T1. Because of such loose coupling and because choke L1 does not provide a low impedance path for load related currents in winding W1, "mouseteeth" distortions are, advantageously, avoided or significantly reduced. "Mouseteeth" distortions are avoided or significantly reduced in a similar way to that described in detail in U.S. patent application No. 651,301 in the name of P.E. Haferl, entitled EAST-WEST CORRECTION CIRCUIT, herein incorporated by reference.

In accordance with a feature of the invention, correction of inside pincushion distortion is accomplished by the "S"-shaping of deflection current $i_y$, in accordance with current $i_3$ that flows in capacitance C4 and in inductor L2 of inside pincushion distortion correction circuit 60. Current $i_3$, that flows as a current component in trace capacitance $C_s$, varies voltage $V_3$ across capacitance $C_s$, during trace, at a frequency that is higher than the trace resonance frequency of the trace resonance circuit of deflection winding $L_H$ and trace capacitance $C_s$. Such trace resonance frequency is, for example, equal to approximately 7KHz. The amplitude of current $i_3$ is modulated by voltage $V_4$ at terminal 28. The higher is the amplitude of current $i_3$, the higher is the peak-to-peak amplitude of voltage $V_3$ that is produced and the more significant is the amount of "S"-shaping of deflection current $i_y$ that is provided, and vice versa.

In accordance with yet another aspect of the invention, capacitance C4 and variable inductor L2 of circuit 60 form with trace capacitance $C_s$ and deflection winding $L_H$ a resonance circuit portion of correction circuit 60 during trace. The resonance circuit portion of circuit 60 is tuned by inductor L2 to a frequency that is equal to or lower than frequency $f_H$, but substantially higher than the resonance frequency of the trace resonant circuit of deflection winding $L_H$ and trace capacitance $C_s$. For the circuit values shown in FIG. 1, inductor L2 may typically be adjusted to tune the resonance circuit portion of circuit 60 to a frequency of 14 KHz. By adjusting such resonance frequency, the amplitude of current $i_3$ is controlled. The value of the inductance of inductor L2 may be, preferably, sufficiently large so as to avoid "mouseteeth" distortion.

Resonance current $i_3$ in, for example, capacitance C4 is generated by voltage $V_3$. The portion of voltage $V_3$ that is caused by current $i_y$ is generally a parabola shaped waveform that, in each horizontal period H, is composed of trace and retrace sinewave portions, respectively. During trace, the corresponding sinewave portion of voltage $V_3$ is at approximative the resonance frequency of winding $L_H$ and Capacitor $C_s$ that, for example, is equal to approximately 7 KHz; during retrace, the corresponding sinewave portion is at approximately 44 KHz.

Figure 3:
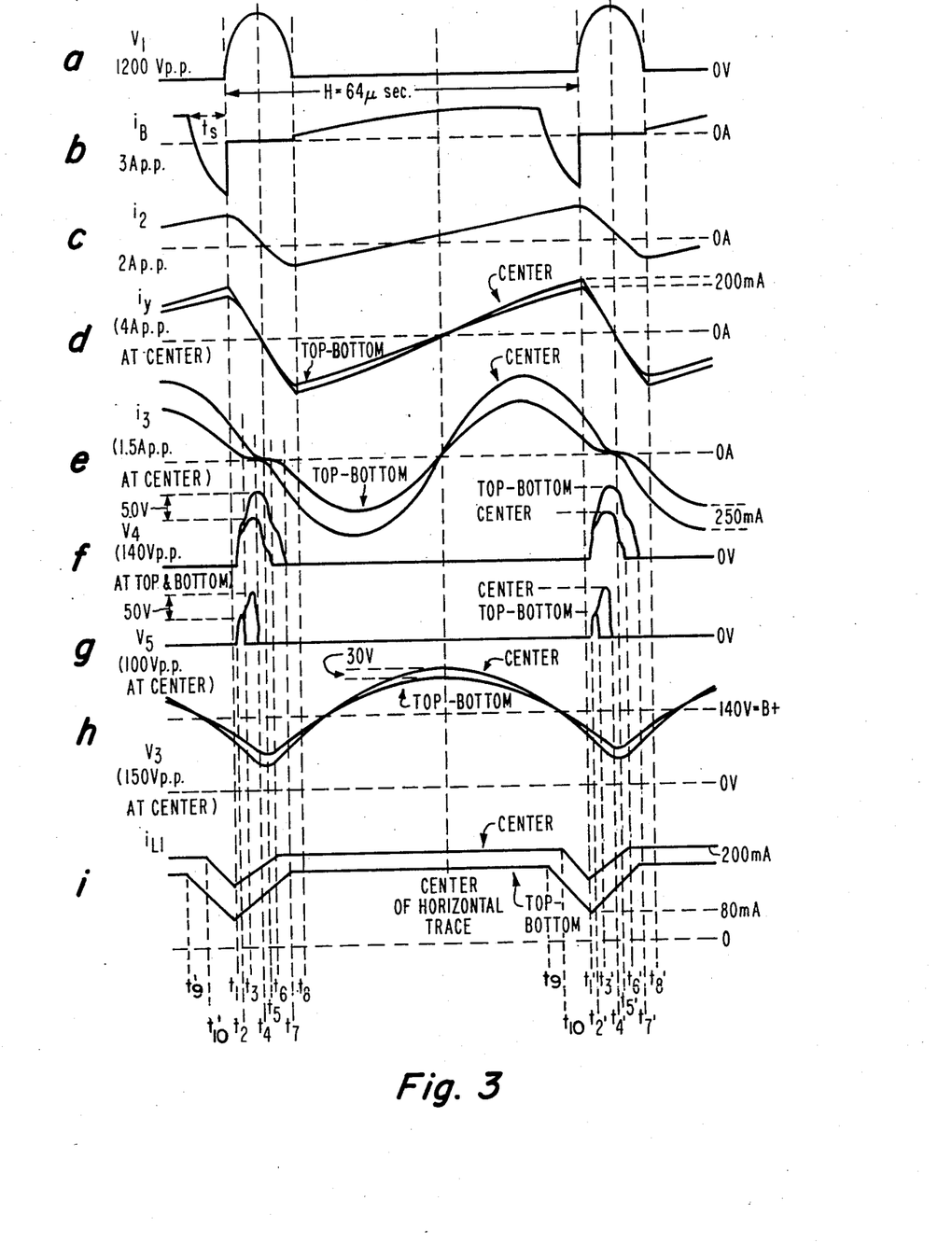
FIGS. 3a–3i illustrate waveforms useful in explaining the operation of the circuit of FIG. 1.

In accordance with another aspect of the invention, inductor L2 and capacitance C4 are included in a circuit branch that, during trace, is coupled in parallel with trace capacitance $C_s$. Resonance current $i_3$ flows, during the first half of the trace, in a direction opposite to the arrow from ground, through diode D4 inductor L2, capacitance C4, capacitance $C_s$, diode D1, deflection transistor Q1 that is conductive and back to ground. FIG. 3b shows a base current $i_B$ of transistor Q1. Note that base current $i_B$ is already supplied at time $t_8$ that is at the beginning of trace for keeping transistor Q1 in saturation. Saturated transistor Q1 provides a ground return for current $i_3$ during the first half of trace. Thus, conductive transistor Q1 keeps voltage $V_1$ at approximately zero at beginning of trace even if the magnitude of negative current $i_3$ that flows from diode D1 to terminal 23 is greater than that of negative current $i_2$ that flows from terminal 23 via winding W1 of transformer T1 to terminal 22a. During the second half of trace, current $i_3$ circulates in the direction of the arrow through diode D3, capacitance $C_s$, capacitance C4 and inductor L2.

Deflection current $i_y$ flows during retrace in a current path that includes retrace capacitor $C_{RD}$, deflection winding $L_H$ and trace capacitor $C_s$. Trace capacitor $C_s$ that provides low impedance during retrace causes deflection current $i_y$ to be bypassed so as to prevent current $i_y$ from flowing, throughout retrace, in the branch of circuit 60 that includes capacitor C4 and inductor L2.

In accordance with a yet further aspect of the invention, because inductor L2 is bypassed by capacitor $C_s$ that is coupled in parallel, the deflection inductance during retrace and retrace voltage $V_1$ are, advantageously, not substantially affected by inductor L2. In contrast, in some prior art circuits, a modulation inductor that provides inside pincushion distortion correction is serially coupled, during at least a portion of retrace, with the deflection winding; therefore such modulation inductor may, disadvantageously, cause an increase in the retrace voltage and in the deflection power dissipation. Therefore, advantageously, circuit 100 of FIG. 1 may require a lower level of voltage B+ when operating at higher deflection frequencies such as, for example, $2 \times f_H$, than in other prior art circuits.

The amplitude of current $i_3$ of FIG. 1 is modulated by voltage $V_4$, which is controlled by the east-west switched current arrangement 25 via current $i_{L1}$. At time $t_1$ of FIG. 3e, at the end of trace, current $i_3$ flows decreasingly via a current path of FIG. 1 that includes diode $D_3$, capacitance $C_s$, capacitance $C_4$ and inductor $L_2$. Voltage $V_4$ of FIG. 3f starts to increase at time $t_2$ without influencing current $i_3$ of FIG. 3e because voltage $V_4$ of FIG. 1, at time $t_2$ of FIG. 3f, is outside the current loop path of current $i_3$ of FIG. 1.

When line scanning occurs at the top or bottom of the raster, current $i_3$ of FIG. 3e decreases to zero near time $t_3$. When line scanning occurs at the center of the raster, current $i_3$ decreases to zero at a later time, near time $t_4$. After the zero crossing of current $i_3$, diode $D_3$ of FIG. 1 becomes nonconductive and current $i_3$ starts to flow, in the direction that is opposite to the arrow, through diode $D_4$, inductor $L_2$, capacitance $C_4$, capacitance $C_s$ and through capacitance $C_{RT}$. Current $i_3$ does not flow then in diode D1, because both diode $D_1$ and transistor Q1 are then nonconductive. As long as positive voltage $V_4$ across capacitance $C_{RT}$ is positive it inhibits current $i_3$ from increasing significantly. Voltage $V_4$ becomes zero at times $t_6$ and $t_7$, for scanning at the center of the raster and at the top-bottom of the raster, respectively. Thus the amplitude of current $i_3$ depends upon both the amplitude and duration of the retrace pulse portion of voltage $V_4$. The retrace pulse portion of voltage $V_4$ is smaller and narrower at the center than at the top or bottom of the raster. Therefore, at the center of the raster voltage $V_4$ produces a higher amplitude of current $i_3$ and a higher amount of "S"-shaping of current $i_y$ than at either the top or bottom of the raster, in a manner that provides the required inside pin correction.

Diodes $D_3$ and $D_4$ isolate capacitance $C_{RT}$ from current $i_3$ during the inverals $t_2$–$t_3$ for top or bottom raster scanning and during the interval $t_2$–$t_4$ for center raster scanning. Thereby, diodes $D_3$ and $D_4$ prevent current $i_3$ from adding charge to capacitance $C_{RT}$. Had a charge been added to capacitance $C_{RT}$, it might have produced an increase of voltage $V_4$. Such increase of voltage $V_4$ can reduce current $i_3$. The result might have been an undesirable oscillation. It should be understood that by removing diodes $D_3$ and $D_4$ and by grounding, instead, terminal 60c of inductor $L_2$, modified circuit 60 may provide sufficient inside pincushion correction without introducing undesirable oscillation when a small amount of inside pincushion correction is required.

FIG. 3e illustrates the waveform of modulated current $i_3$ for top-bottom and center scanning examples, respectively. Note that the peak-to-peak amplitude of current $i_3$ for the center scanning example is higher. FIG. 3h illustrates the waveform of parabolic voltage $V_3$ across trace capacitance $C_s$ that is modulated by current $i_3$. Note that the waveform associated with the center of the raster is more steeply sloped and, therefore, contains a larger amplitude of high frequency component than the waveform associated with the top or bottom of the raster. The peak-to-peak amplitude of current $i_3$ that is 1.5 A, in the center scanning example of FIG. 3e, is large relative to that of current $i_y$. This relatively large amplitude is needed to enable capacitor $C_s$ of FIG. 1 to integrate current $i_3$ to sufficiently modify parabola voltage $V_3$ to provide the required inside pin correction.

FIG. 3d illustrates the waveforms of deflection current $i_y$ with inside and outside pincushion correction for the top-bottom and center scanning examples, respectively. At the center of the raster, the amplitude of current $i_y$ is higher and the "S"-shaping of current $i_y$ is more pronounced than at either the top or the bottom of the raster.

Figure 6:
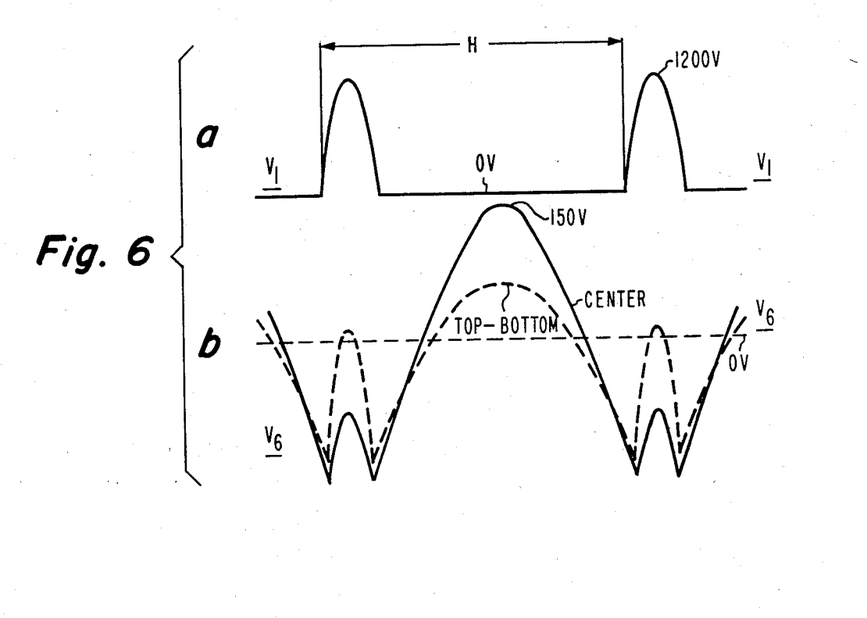
FIG. 6 illustrates additional waveforms useful in explaining the operation of the circuit of FIG. 1.

FIG. 6b illustrates, at a horizontal rate time scale, the waveform of voltage $V_6$ between ground and terminal 60b the corresponding plate of capacitance $C_4$ near to inductor $L_2$. The waveform shows the resonance voltages across capacitances $C_4$ and $C_s$ superimposed on voltage $V_4$.

The amount of inside pincushion correction, relative to that of outside pin correction is, advantageously, adjustable by adjusting the inductance of inductor $L_2$. Maximum inside pincushion correction is obtained when inductor $L_2$ is adjusted for obtaining maximum amplitude of current $i_3$ that occurs when capacitance $C_4$ and inductor $L_2$ resonate substantially at line frequency $f_H$. Increasing the inductance of inductor $L_2$ results in a corresponding decrease in the amplitude of current $i_3$ and in a lower amount of S-shaping. Parabolic voltage $V_3$ is at the frequency $f_H$. Therefore, current $i_3$ that is controlled by voltage $V_3$ remains at line frequency $f_H$. Preferably, inductor $L_2$ does not tune the resonant circuit portion of circuit 60 to resonance at frequencies higher than line frequency $f_H$. Tuning circuit 60 to resonance at a frequency higher than frequency $f_H$ would add an asymmetric horizontal linearity error. The asymmetrical horizontal linearity error is caused, because, during trace, the zero crossing of current $i_3$ may occur, for example, prior to the center of trace and, during retrace, it may occur prior to time $t_2$ or $t_3$ of the respective waveform examples of current $i_3$.

E-W control circuit adjustments such as Width, Outside Parabola Amplitude or Trapeze result in a corresponding change in voltage $V_4$ and, advantageously, in a proportional change of in the amount of inside pincushion correction.

Diode D2, which is parallel coupled to the arrangement of diodes $D_3$ and $D_4$ may be omitted. If diode D2 is omitted, diodes $D_3$ and $D_4$ may then be of the type which has a higher current rating such as, for example, BY 299.

Deflection circuit 100, with values and device types as shown in FIG. 1 and providing horizontal deflection for a Philips 110° 45AX FS picture tube type A66-EAK00X01, is capable of substantially reducing E-W outside raster distortion of 9% and E-W inside raster distortion of 3%. Additionally, "mouseteeth" distortions are, advantageously, substantially reduced.

Figure 5:
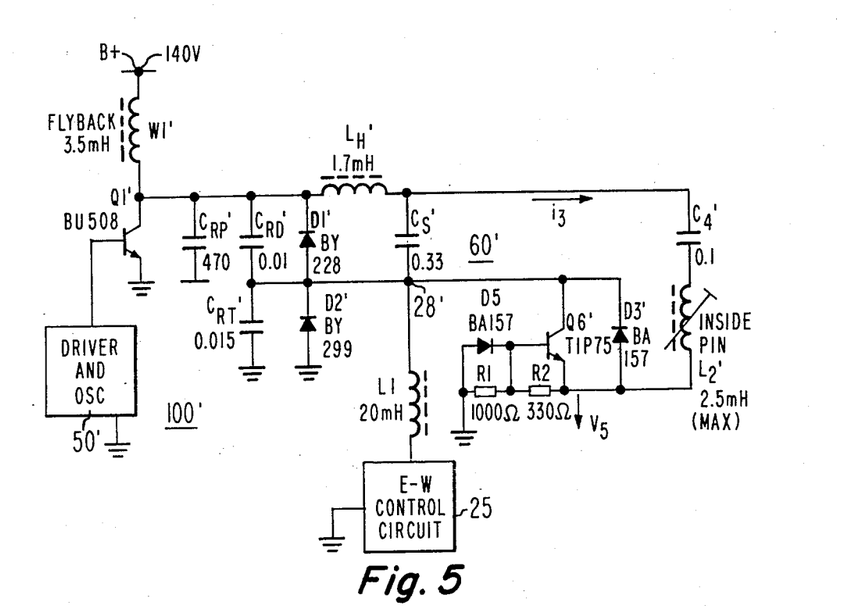
FIG. 5 illustrates a second embodiment of the invention.

Deflection circuit 100' of FIG. 5 embodies a further aspect of the invention. Similar numbers and symbols in FIGS. 1 and 5 indicate similar items or functions. In circuit 100' of FIG. 5, when current $i_3$ flows oppositely to the direction of the arrow, during the first half of trace, current $i_3$ does not flow through diode D1' and transistor Q1'. Instead, it flows in a transistor Q6'. Therefore, base drive current $i_B$ for transistor Q1' is not required, during the first half of trace. Transistor Q6' operates in common base configuration. Current $i_3$ flows during the first half of trace through inductor $L_2'$ capacitance $C_4'$, capacitance $C_s'$ and the collector-emitter path of transistor Q6'. During the second half of trace, current $i3$ flows through diode $D_3'$, capacitance $C_s'$, capacitance $C_4'$ and inductor $L_2'$. Transistor Q6' clamps the low side of capacitor $C_s'$ at a terminal 28' to ground during the first half of trace and suppresses visible vertical bars caused by ringing in winding W1' of the flyback transformer. In other respects, the operation of circuit 100' of FIG. 5 is similar to that of circuit 100 of FIG. 1.

Figure 7:
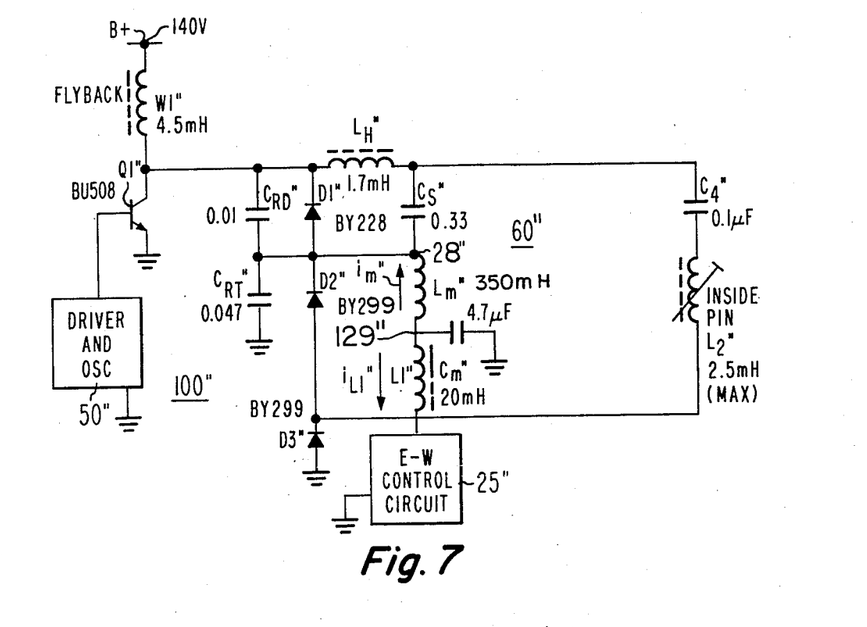
FIG. 7 illustrates a third embodiment of the invention that includes a diode modulator.

Deflection circuit 100″ of FIG. 7 embodies a yet further aspect of the invention. Similar numbers and symbols in FIGS. 7, 5 and 1 illustrate similar items or functions. Circuit 100″ of FIG. 7, provides outside pincushion distortion correction similarly to a conventional diode modulator. Circuit 100″ includes a diode modulator coil $L_m″$ having one end terminal that is coupled to a terminal 28″ between diodes D1″ and D2″. The other terminal of coil $L_m″$, a terminal 129″, is coupled to a choke L1″ that provides an east-west or outside pin modulation current $i_{L1}″$ at the vertical rate that is supplied by a control circuit 25″. A modulator trace capacitor $C_m″$ is coupled between terminal 129″ and ground. A modulator retrace capacitor $C_{RT}″$ and coil $L_m″$ form a retrace resonant circuit that resonates during retrace at the deflection retrace frequency that is approximately 44 KHz. A current $i_m″$ in inductor $L_m″$ is at the horizontal rate. Similarly, deflection winding $L_H″$ and deflection retrace capacitor $C_{RD}″$ form a second retrace resonance circuit that resonates during retrace at the deflection retrace frequency as in a conventional diode modulator. Inductor $L_m″$, deflection winding $L_H″$ and capacitors $C_{RD}″$ and $C_{RT}″$ form a balanced bridge circuit such that the ratio of the inductance of deflection winding $L_H″$ to that of inductor $L_m″$ is substantially that of the ratio of capacitor $C_{RT}″$ and $C_{RD}″$.

An inside pincushion correction circuit 60″ includes the series arrangement of a capacitor $C_4″$ and an inductor $L_2″$ coupled to deflection trace capacitor $C_s″$. Circuit 60″ provides inside pincushion distortion correction in a manner similar to that discussed before with respect to the circuits of FIGS. 1 and 5. Thus, inside pincushion distortion correction circuit 60″ may be utilized in conjunction with various types of deflection and outside pincushion correction circuits to provide inside pincushion distortion correction.

What is claimed:

1. A deflection apparatus with inside pincushion distortion correction, comprising:
   a source of an input signal at a frequency that is related to a deflection rate;
   a deflection winding for generating, at said deflection rate, scanning current in said deflection winding during a trace interval and during a retrace interval of a deflection cycle;
   switching means coupled to said deflection winding and responsive to said input signal for generating, during said retrace interval, a retrace voltage and for generating said scanning current in said deflection winding;
   a source of modulation signal at a second frequency;
   means responsive to said retrace voltage and to said modulation signal for generating a modulated voltage during said retrace interval that is modulated in accordance with said modulation signal;
   a trace capacitance coupled to said deflection winding to form with said deflection winding a first trace resonant circuit during said trace interval such that said scanning current that flows in said trace capacitance develops during said trace interval a parabolic voltage in said trace capacitance; and
   a circuit branch, including a second capacitance and a modulation inductance coupled to said trace capacitance to form a second resonant circuit for generating in said modulation inductance a modulation current at an amplitude that is modulated by said modulated voltage during said retrace interval, said modulation current being coupled to said trace capacitance to vary said parabolic voltage in said trace capacitance in accordance with the amplitude of said parabolic voltage in a manner to reduce inside pincushion distortion, such that said trace capacitance acts as a low impedance bypass capacitance for said scanning current around said modulation inductance substantially throughout said retrace interval.

2. An apparatus according to claim 1 wherein said second resonant circuit has a resonance frequency that is substantially higher during said trace interval than that of said first trace resonant circuit.

3. An apparatus according to claim 1 wherein said modulation inductance is coupled in series with said second capacitance.

4. An apparatus according to claim 1 wherein said modulated voltage generating means modulates said scanning current in a manner to reduce outside pincushion distortion.

5. An apparatus according to claim 4 wherein the resonance frequency of said second resonant circuit is adjustable for establishing a required ratio between an amplitude of said modulation current that is required for obtaining inside pincushion correction and a corresponding amplitude of said scanning current that is required for obtaining outside pincushion correction.

6. An apparatus according to claim 5 wherein the resonance frequency of said second resonant circuit is adjustable for obtaining inside pincushion distortion correction without substantially affecting the modulation of said scanning current that reduces outside pincushion distortion.

7. A deflection apparatus according to claim 1 wherein said circuit branch is coupled in parallel with said trace capacitance during said trace interval.

8. An apparatus according to claim 1 wherein said deflection winding is coupled in parallel with said circuit branch and in parallel with said trace capacitance during said trace interval.

9. A deflection apparatus according to claim 1 further comprising first and second diodes, wherein said circuit branch is coupled across said trace capacitance via said first diode during a first portion of said trace interval and via said second diode during a second portion of said trace interval.

10. A deflection apparatus according to claim 1 further comprising a diode and a transistor wherein said circuit branch includes a first terminal that is coupled to one plate of said trace capacitance and a second terminal that is coupled to the other plate of said trace capacitance, said second terminal being coupled via said diode during a first portion of said trace interval and via said transistor during a second portion of said trace interval.

11. A deflection apparatus according to claim 10 wherein said diode conducts said current in said branch at a first polarity and said transistor conducts said current in said branch at the opposite polarity.

12. A deflection apparatus according to claim 1 wherein said modulation and scanning currents are combined to flow in said trace capacitance to develop said parabolic voltage such that, substantially throughout said trace interval, said modulation and scanning currents in said trace capacitance are at the same polarities, respectively.

13. A deflection apparatus according to claim 1 further comprising a source of supply energy, a supply inductance coupled to said switching means and said source of supply energy for producing therein said retrace voltage during said retrace interval of said deflection cycle, a first retrace capacitance that forms a retrace resonant circuit with said deflection winding during said retrace interval of said deflection cycle, a load circuit coupled to said supply inductance and energized during said retrace interval, and an impedance, that at the retrace frequency of said scanning current is of substantially higher value than that of said deflection winding, wherein said impedance is interposed in a current path between said retrace resonant circuit and said supply inductance for reducing substantial energy transfer between said retrace resonant circuit and said load circuit during said retrace interval in a manner to reduce mouseteeth distortion.

14. A deflection apparatus according to claim 13, wherein said impedance comprises a choke.

15. A deflection apparatus according to claim 13 wherein said supply inductance comprises a primary winding of a flyback transformer.

16. A deflection apparatus according to claim 13 further comprising a second retrace capacitance coupled to said retrace voltage, and a second source of modulation current is coupled to said second retrace capacitance for controlling the voltage across said first retrace capacitance during said retrace interval to obtain outside pincushion distortion correction.

17. A deflection apparatus according to claim 1 wherein said modulated voltage generating means modulates the amplitude and duration of said modulated voltage during said retrace interval.

18. A deflection apparatus according to claim 1 wherein said means that generates said modulated voltage comprises a second source of modulation current responsive to said modulation signal and a retrace capacitance that is coupled to said second source of modulation current and to said switching means.

19. An apparatus according to claim 1 including a diode modulator, said diode modulator including first and second retrace capacitances coupled to said switching means, a second modulation inductance coupled to said source of modulation signal and to said second retrace capacitance to form with said second retrace capacitance a second resonant circuit, and first and second diodes that are coupled across said first and second retrace resonant circuits, respectively.

20. A deflection apparatus according to claim 1 wherein said input signal is at a horizontal scanning frequency and wherein said modulation signal is at a vertical scanning frequency.

21. A deflection apparatus according to claim 1 wherein said modulation inductance is adjustable for controlling the modulation depth of said current in said circuit branch so as to obtain inside pincushion distortion reduction that is required without substantially affecting the modulation of said scanning current that provides the outside pincushion distortion reduction that is required.

22. A deflection apparatus according to claim 21 wherein the resonance frequency of said second resonant circuit is tuned by said modulation inductance to a frequency that is lower than or equal to said deflection rate.

23. A deflection apparatus according to claim 1 wherein said switching means generates said retrace voltage at a terminal thereof and wherein said trace capacitance isolates said modulation inductance from said terminal of said switching means during said retrace interval to prevent said modulation inductance from affecting an amplitude of said retrace voltage.

24. A deflection apparatus with inside pincushion correction, comprising:
 a first circuit branch that includes a deflection winding;
 switching means coupled to said deflection winding for generating scanning current at a deflection frequency in said deflection winding;
 a second circuit branch coupled in parallel with said first circuit branch during a trace interval of a deflection cycle and responsive to said scanning current, said second circuit branch including a trace capacitance that develops from said scanning current a parabolic voltage in said trace capacitance;
 a source of correction modulation signal at a second frequency; and
 a third circuit branch responsive to said modulation signal and coupled in parallel with the other two circuit branches during said trace interval, said third circuit branch including a modulation inductance and a second capacitance that form a resonant circuit for generating a current in said third circuit branch that is modulated, in accordance with said modulation signal, and that is coupled to said second circuit branch to modulate said parabolic voltage in a manner to provide inside pincushion distortion correction.

25. An apparatus according to claim 24 further comprising means responsive to said modulation signal for generating, during said retrace interval, a retrace voltage that is modulated in accordance with said modulation signal, said retrace voltage being coupled to said modulation inductance for modulating said current in said third circuit branch.

26. An apparatus according to claim 24 further comprising a switch that couples said third and second circuit branches in parallel during said trace interval and that switches states during said retrace interval.

27. A deflection apparatus with inside pincushion distortion correction, comprising:
 a deflection winding;
 switching means coupled to said deflection winding for generating scanning current therein;
 a deflection trace capacitance coupled to said deflection winding;
 a deflection retrace capacitance coupled to said deflection winding to form a first retrace resonant circuit;
 an outside pin modulation inductance;
 an outside pin retrace capacitance coupled to said modulation inductance to form a second retrace resonant circuit that is coupled to said first resonant circuit;
 an outside pin modulation capacitance coupled to said outside pin modulation inductance;
 a source of outside pincushion correction current coupled to said outside pin modulation inductance to provide outside pincushion correction modulation of said scanning current;
 an inside pin modulation inductance; and
 an inside pin capacitance coupled to said inside pin modulation inductance and to said trace capacitance to form a resonant circuit that generates a current modulated at a vertical rate for providing inside pincushion correction modulation of said scanning current.

* * * * *